(12) United States Patent
Nonaka et al.

(10) Patent No.: US 7,534,478 B2
(45) Date of Patent: May 19, 2009

(54) RELEASE LINER AND PRESSURE-SENSITIVE ADHESIVE TAPE OR SHEET EMPLOYING THE SAME

(75) Inventors: Takahiro Nonaka, Ibaraki (JP); Shinji Inokuchi, Ibaraki (JP); Masahiro Oura, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 11/129,499

(22) Filed: May 16, 2005

(65) Prior Publication Data

US 2005/0266195 A1    Dec. 1, 2005

(30) Foreign Application Priority Data

May 14, 2004  (JP) ............... P.2004-145085
Feb. 17, 2005  (JP) ............... P.2005-040246

(51) Int. Cl.
  *B32B 9/00*   (2006.01)
  *B32B 33/00*  (2006.01)
  *B32B 7/12*   (2006.01)
  *B32B 15/04*  (2006.01)

(52) U.S. Cl. ............... 428/40.1; 428/40.9; 428/343; 428/344

(58) Field of Classification Search ............... 428/40.1, 428/40.9, 41.5, 343, 344
See application file for complete search history.

(56) References Cited

U.S. PATENT DOCUMENTS

| | | | |
|---|---|---|---|
| 4,339,485 A | | 7/1982 | Shibano et al. |
| 4,425,176 A | | 1/1984 | Shibano et al. |
| 4,777,201 A | * | 10/1988 | Shigemoto et al. .......... 524/269 |
| 5,085,907 A | * | 2/1992 | Smith .......... 428/41.3 |
| 5,817,386 A | | 10/1998 | Adamko et al. |
| 5,948,517 A | | 9/1999 | Adamko et al. |
| 6,228,449 B1 | | 5/2001 | Meyer |
| 2002/0081426 A1 | | 6/2002 | Inokuchi et al. |
| 2002/0114967 A1 | | 8/2002 | Yamamoto et al. |
| 2003/0077412 A1 | | 4/2003 | Wang |
| 2003/0077442 A1 | | 4/2003 | Inokuchi et al. |

FOREIGN PATENT DOCUMENTS

| | | |
|---|---|---|
| DE | 197 24 648 A1 | 12/1998 |
| EP | 0 306 232 A2 | 3/1989 |
| EP | 1 146 170 A1 | 10/2001 |
| EP | 1 258 517 A2 | 11/2002 |

(Continued)

OTHER PUBLICATIONS

Chinese Office Action dated Dec. 29, 2006.

(Continued)

*Primary Examiner*—Patricia L Nordmeyer
(74) *Attorney, Agent, or Firm*—Sughrue Mion, PLLC

(57) ABSTRACT

The release liner includes a release layer constituted of at least one polyolefin resin, wherein the release layer has surface irregularities. The surface irregularities of the release layer may be constituted of recesses and protrusions which are irregularly different in shape and have been disposed in irregular arrangement. The release layer preferably has a surface roughness Ra of 1-3 μm. As the polyolefin resin constituting the release layer can be used at least one polyolefin resin selected from the group consisting of polyethylenes, polypropylene, polybutenes, poly(4-methyl-1-pentene), and copolymers of ethylene with one or more α-olefins having 3-10 carbon atoms.

10 Claims, 4 Drawing Sheets

FOREIGN PATENT DOCUMENTS

| | | |
|---|---|---|
| EP | 1 277 818 A2 | 1/2003 |
| JP | 51-20205 B | 6/1976 |
| JP | 6-99551 A | 4/1994 |
| JP | 6-155687 A | 6/1994 |
| JP | 8-27441 A | 1/1996 |
| JP | 2001-246697 A | 9/2001 |
| JP | 2001-262093 A | 9/2001 |
| JP | 2002-219778 A | 4/2003 |
| JP | 2003-127299 A | 5/2003 |
| KR | 2001-0098335 | 11/2001 |

OTHER PUBLICATIONS

Korean Office Action dated May 31, 2007.
European Office Action dated Jul. 12, 2007.

\* cited by examiner

RELEASE LINER AND PRESSURE-SENSITIVE ADHESIVE TAPE OR SHEET EMPLOYING THE SAME

FIELD OF THE INVENTION

The present invention relates to a pressure-sensitive adhesive tape or sheet and a release liner for use therein. More particularly, the invention relates to a pressure-sensitive adhesive tape or sheet which is useful in hard-disk drives and to a release liner for use in the adhesive tape or sheet.

BACKGROUND OF THE INVENTION

The release liners for use in pressure-sensitive adhesive tapes are generally constituted of a release-liner substrate and a release agent layer formed on the substrate. Known as the release agent layer is one formed by applying a silicone release agent and curing it. For example, in double-sided pressure-sensitive adhesive tapes or the like, the release liners coated with a silicone release agent and having, formed thereon, a pressure-sensitive adhesive layer comprising an acrylic pressure-sensitive adhesive are included in examples of that release liner. However, such a release liner coated with a silicone release agent has a problem that when the pressure-sensitive adhesive tape is used, part of the silicone compound contained in the release liner remains adherent to the adhesive layer side and thus contaminates the adhesive layer, resulting in considerably impaired adhesive performance. In addition, use of this kind of pressure-sensitive adhesive tape for fixing or other properties in producing electronic appliances such as HDDs (magnetic recording apparatus), especially in inner parts of such electronic appliances, has a problem that the pressure-sensitive adhesive tape causes the corrosion of inner parts of the electronic appliances and operation errors. This is because those parts of the adhesive layer which have been contaminated with the silicone compound contained in the release liner serve as a siloxane gas source.

On the other hand, release liners to which a releasing function has been imparted without using a silicone release agent such as that described above are known. Examples thereof include: ones comprising a release-liner substrate and a release layer which comprises a low-density polyethylene resin layer and has been formed on the substrate by extrusion laminating while inhibiting the layer from undergoing surface oxidation (see JP-B-51-20205 (The term "JP-B" as used herein means an "examined Japanese patent application") and JP-A-U-63-85642 (the term "JP-A-U" as used herein means an "unexamined published Japanese utility model application")); ones comprising a release-liner substrate and a release layer formed thereon by extrusion laminating which comprises a resin blend of low-density polyethylene with a lowly crystalline ethylene/propylene copolymer or lowly crystalline ethylene/butene-1 random copolymer (see JP-B-57-45790 and JP-A-6-155687 (the term "JP-A" as used herein means an "unexamined published Japanese patent application")); and one which comprises a substrate and an ethylene polymer release layer formed in a specific thickness ratio over the substrate through an undercoat layer and which has a specific value of outgassing amount (see JP-A-2003-127299). Also known is a technique in which a pressure-sensitive adhesive is caused to conform to surface irregularities of a release liner and thereby form recesses and protrusions on the surface of the pressure-sensitive adhesive layer for the purpose of imparting a fine structure to the pressure-sensitive adhesive layer (see JP-T-9-50423 and JP-T-2001-507732 (The term "JP-T" as used herein means a "published Japanese translation of a PCT patent application"). Furthermore, release liners employing a fluorochemical release agent as another release agent are widely known. These release liners are used as pressure-sensitive adhesive sheets or tapes after a pressure-sensitive adhesive layer is formed thereon in the subsequent step.

Pressure-sensitive adhesive tapes (or sheets) for hard-disk drives (HDDS) are applied by automatic machine application, which necessitates no personnel cost, in order to cope with the recent rapid cost reduction in hard-disk drives and are applied at a high speed in order to further increase the efficiency of mass production. In this high-speed automatic machine application, an operation is first conducted which comprises holding a pressure-sensitive adhesive tape on an air suction table by air suction on the base side (the side opposite to the pressure-sensitive adhesive layer, or the back side) of the tape, stripping the release liner from the tape thus held, and applying the tape to a hard-disk drive. In this operation, in case where the air suction is too strong, not only the pressure-sensitive adhesive tape itself becomes rugged, resulting in a considerably impaired appearance, but also airtightness, which is one of the functions of pressure-sensitive adhesive tapes for hard-disk drives (HDDs), is impaired. Because of this, air suction can be conducted only when the power of air suction is on the minimum necessary level. Consequently, in such high-speed stripping, the peel force necessary for stripping the release liner from the pressure-sensitive adhesive tape (or sheet) for hard-disk drives (HDDs) is required to be lower than the minimum necessary force of air suction. This peel force lower than the air suction force is 0.3 N/50 mm or lower in terms of the peel force of the release liner stripped under the conditions of a peel rate of 1 m/min and a peel angle of 180°.

Incidentally, a release liner is known in which the release layer has surface irregularities so as to reduce peel force (see JP-A-2002-219778). However, the release agent employed in this related-art release liner having surface irregularities is not a polyolefin resin but a silicone resin, fluororesin, or the like.

Furthermore, precision electronic appliances including HDDs (magnetic recording apparatus) are susceptible to static electricity. In case where static electricity generates in an HDD production step, there is the possibility that troubles might be aroused in the appliances by the static electricity.

However, among the release liners to which a releasing function has been imparted without using a silicone release agent, the release liners having a release layer comprising a polyolefin resin, for example, do not show a satisfactory releasing function in application to pressure-sensitive adhesives having high tackiness and necessitate a peel force higher than the air suction force. These release liners are not usable in high-speed stripping by an automatic machine. Furthermore, part of the pressure-sensitive adhesive is transferred to the release layer upon stripping or the stripping operation results in pulse stripping (so-called "stick slip"). Consequently, the pressure-sensitive adhesive layer comes to have a rough surface and, hence, the performance originally possessed by the pressure-sensitive adhesive layer cannot be effectively exhibited.

On the other hand, the release liners employing a fluorochemical release agent are satisfactory with respect to smooth stripping from the pressure-sensitive adhesive layer. However, because these release liners are highly expensive, use thereof makes it impossible to cope with the demand for material cost reduction which accompanies the recent trend toward cost reduction in hard-disk drives.

Furthermore, when general pressure-sensitive adhesive tapes or sheets are used, there are cases where stripping the release liner causes static buildup. There has been the possibility that a minute current which flows in this case might arouse troubles in precision electronic appliances.

SUMMARY OF THE INVENTION

Accordingly, an object of the invention is to provide a release liner having a release layer which can be smoothly separated from pressure-sensitive adhesive layers without the necessity of using a silicone release agent in the release layer, and to provide a pressure-sensitive adhesive tape or sheet employing the release liner.

Another object of the invention is to provide a release liner which is effective in reducing the voltage level for the static buildup occurring when the release liner is stripped from pressure-sensitive adhesive tapes or sheets, and to provide a pressure-sensitive adhesive tape or sheet employing this release liner.

Still another object of the invention is to provide a pressure-sensitive adhesive tape or sheet which, when applied to a hard-disk drive, does not foul the hard-disk drive and can be applied by a "high-speed automatic machine application system" even when the pressure-sensitive adhesive layer has high tackiness, and which is hence useful for hard-disk drives, and to provide a release liner for use in this pressure-sensitive adhesive tape or sheet.

The present inventors made intensive investigations in order to accomplish those objects. As a result, they have found that when a release liner having a release layer which is constituted of a polyolefin resin and has a specific surface shape is used as the release liner of a pressure-sensitive adhesive tape or sheet, then the release layer can be smoothly separated from the pressure-sensitive adhesive layer without the necessity of using a silicone release agent in the release layer. It has been further found that when this pressure-sensitive adhesive tape or sheet is applied to a hard-disk drive, it does not foul the hard-disk drive and can be applied by a "high-speed automatic machine application system" due to the specific release layer. The invention has been completed based on these findings.

Namely, the invention provides a release liner comprising a release layer constituted of at least one polyolefin resin, wherein the release layer has surface irregularities.

In the release liner of the invention, the surface irregularities of the release layer preferably are constituted of recesses and protrusions which are irregularly different in shape and have been disposed in irregular arrangement. The release layer preferably has a surface roughness Ra of 1-3 µm. The polyolefin resin constituting the release layer preferably is at least one polyolefin resin selected from the group consisting of polyethylenes, polypropylene, polybutenes, poly(4-methyl-1-pentene), and copolymers of ethylene with one or more α-olefins having 3-10 carbon atoms. The release liner preferably has a constitution in which the release layer has been superposed over a substrate directly or through one or more other layers.

The release liner preferably has an antistatic function. This release liner preferably has a substrate and an antistatic layer disposed on at least one side of the substrate or in the substrate. The antistatic layer preferably is a metal foil layer or a vapor-deposited metal layer.

The invention further provides a pressure-sensitive adhesive tape or sheet having a pressure-sensitive adhesive layer, wherein the release liner described above has been superposed on the pressure-sensitive adhesive layer in such a manner that the pressure-sensitive adhesive layer is in contact with the release layer.

In this pressure-sensitive adhesive tape or sheet, the pressure-sensitive adhesive layer is preferably constituted of an acrylic pressure-sensitive adhesive. Furthermore, the pressure-sensitive adhesive tape or sheet preferably has a constitution comprising the pressure-sensitive adhesive layer formed by applying a pressure-sensitive adhesive to a supporting base and the release liner laminated to the pressure-sensitive adhesive layer.

The pressure-sensitive adhesive tape or sheet of the invention is suitable for use as a pressure-sensitive adhesive tape or sheet for hard-disk drives.

Figure 1:
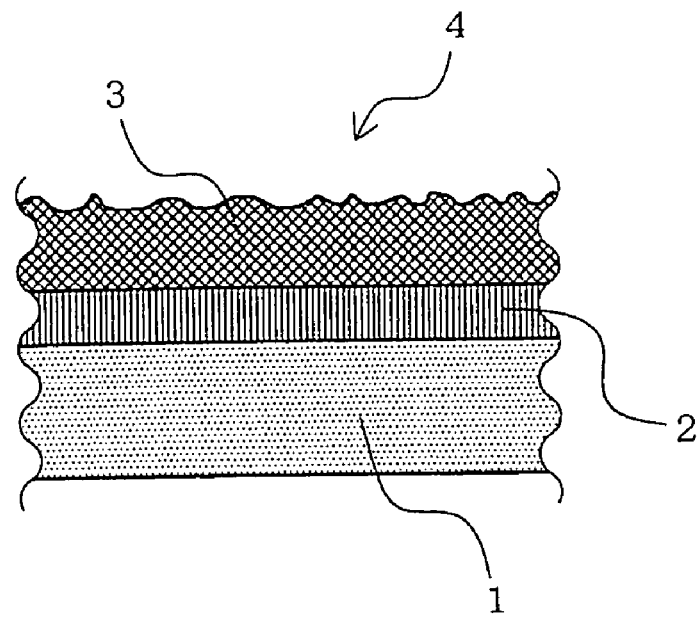
FIG. 1 is a diagrammatic sectional view illustrating part of one embodiment of the release liner of the invention.

DESCRIPTION OF REFERENCE NUMERALS AND SIGNS 1 substrate (release-liner substrate)
1a substrate (release-liner substrate)
1b substrate (release-liner substrate)
2 undercoat layer
3 release layer having surface irregularities (surface-irregular release layer)
4 release liner
4a release liner
4b release liner
4c release liner
4d release liner
5 pressure-sensitive adhesive layer
6 supporting base (supporting base for pressure-sensitive adhesive tape)
7 pressure-sensitive adhesive tape
7a pressure-sensitive adhesive tape
7b pressure-sensitive adhesive tape
7c pressure-sensitive adhesive tape
8 antistatic layer

DETAILED DESCRIPTION OF THE INVENTION

The invention will be explained below in detail by reference to drawings according to need. In the drawings, like members or parts are sometimes designated by like numerals or signs.

[Release Liner]

FIG. 1 is a diagrammatic sectional view illustrating part of one embodiment of the release liner of the invention. In FIG. 1, numeral 1 denotes a substrate (release-liner substrate), 2 an undercoat layer, 3 a release layer having surface irregularities (often referred to as "surface-irregular release layer"), and 4 a release liner. The release liner 4 shown in FIG. 1 is constituted of a substrate 1, an undercoat layer 2 formed on one side of the substrate 1, and a surface-irregular release layer 3 formed on the undercoat layer 2. The surface-irregular release layer 3 is made of a polyolefin resin and has surface irregularities (has a surface structure with irregularities). Namely, the release liner 4 has a release layer 3 which is constituted of a polyolefin resin and has surface irregularities.

Since the release layer of the release liner of the invention is constituted of a polyolefin resin as shown above, this release liner, even when used for the surface protection of a pressure-sensitive adhesive layer, is free from the transfer of a silicone ingredient derived from a silicone release agent to the pressure-sensitive adhesive layer. In addition, although the release layer of the release liner is constituted of not a silicone release agent but a polyolefin resin, the release layer can be smoothly separated from the pressure-sensitive adhesive layer because the release layer has surface irregularities.

Specifically, when the release liner of the invention is used for the protection of the pressure-sensitive adhesive layer of a pressure-sensitive adhesive tape or sheet for hard-disk drives, the 180° peel force required for the release liner to be peeled from the underlying pressure-sensitive adhesive layer (pulling rate, 1 m/min; 23° C.×60% RH) can be reduced to 0.3 (N/50 mm) or lower [preferably 0.25 (N/50 mm) or lower, more preferably 0.2 (N/50 mm) or lower].

Consequently, the following effects are brought about. When the release liner is used for the protection of the pressure-sensitive adhesive layer of a pressure-sensitive adhesive tape or sheet for hard-disk drives, the pressure-sensitive adhesive layer of the pressure-sensitive adhesive tape or sheet for hard-disk drives is protected with the release layer constituted of a polyolefin resin. Consequently, when this tape or sheet is applied to a hard-disk drive, the hard-disk drive does not suffer fouling by a silicone ingredient. In addition, even when the pressure-sensitive adhesive layer has high tackiness, the release layer with which the pressure-sensitive adhesive layer is protected can be smoothly separated from the pressure-sensitive adhesive layer by a high-speed automatic machine in application to a hard-disk drive because the release layer has surface irregularities. Consequently, even in the case where a "high-speed automatic machine application system" which is a system for application by a high-speed automatic machine is used, the release liner can be fully satisfactorily stripped from the pressure-sensitive adhesive layer by the high-speed automatic machine. The operation for application to hard-disk drives can be conducted at an excellent operating efficiency. It is therefore possible to attain the automatization of application of a pressure-sensitive adhesive tape or sheet and to further attain the mass production of hard-disk drives, a reduction of the cost thereof, etc.

As the pressure-sensitive adhesive layer of the pressure-sensitive adhesive tape or sheet for hard-disk drives, a pressure-sensitive adhesive layer which has been utilized hitherto can be used. The pressure-sensitive adhesive layer to be used is not limited at all. It is a matter of course that the release layer comprising a polyolefin resin in the release liner exerts no adverse influence on the pressure-sensitive adhesive properties of the pressure-sensitive adhesive tape or sheet for hard-disk drives.

Figure 2A:
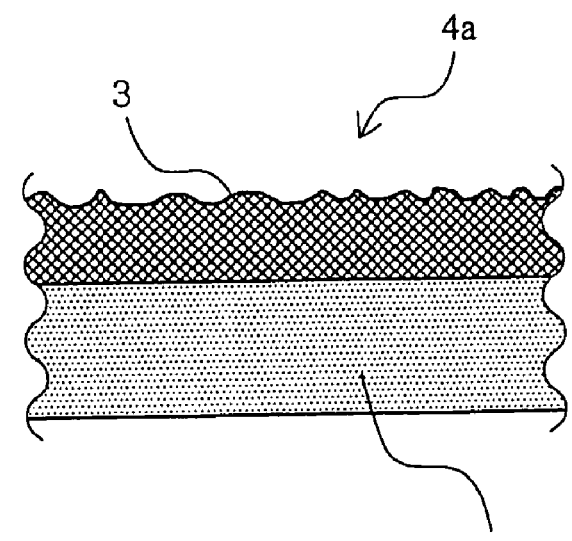
FIGS. 2A and 2B are diagrammatic sectional views illustrating part of other embodiments of the release liner of the invention.
Figure 2B:
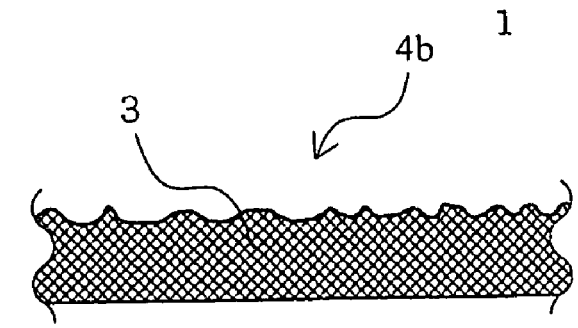
Figure 3A:
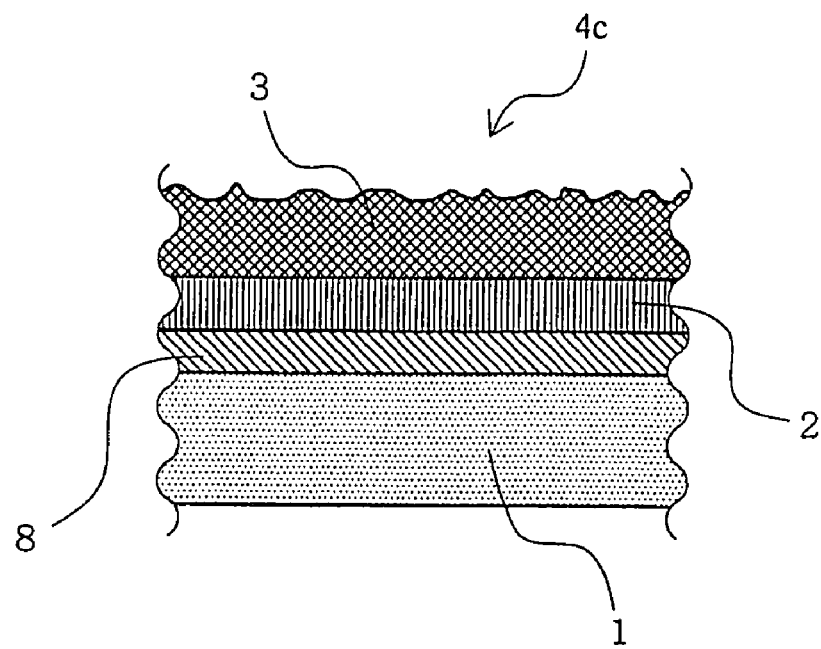
FIGS. 3A and 3B are diagrammatic sectional views illustrating part of still other embodiments of the release liner of the invention.
Figure 3B:
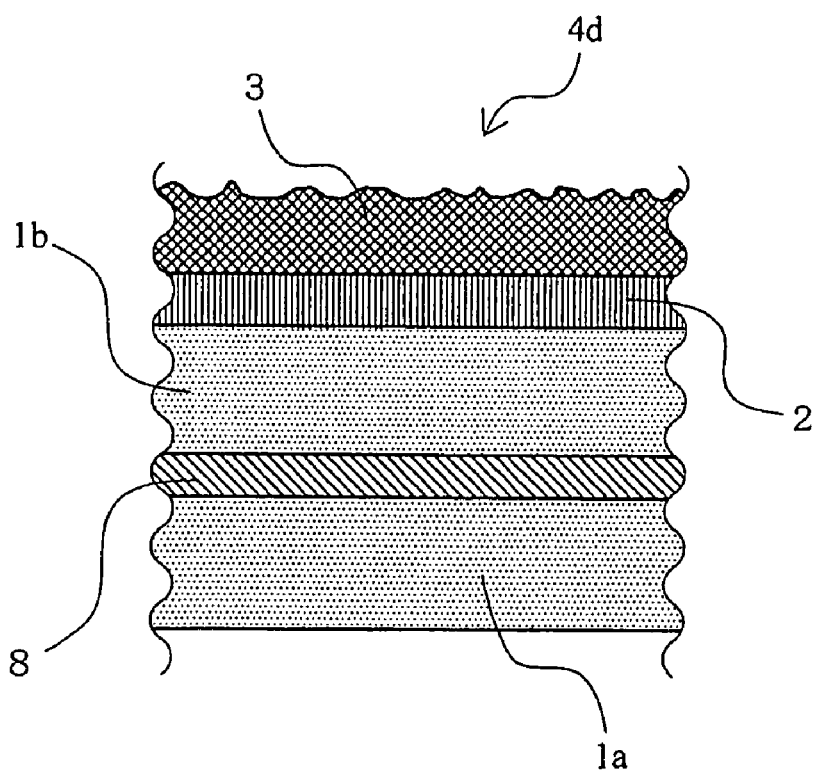
Figure 4A:
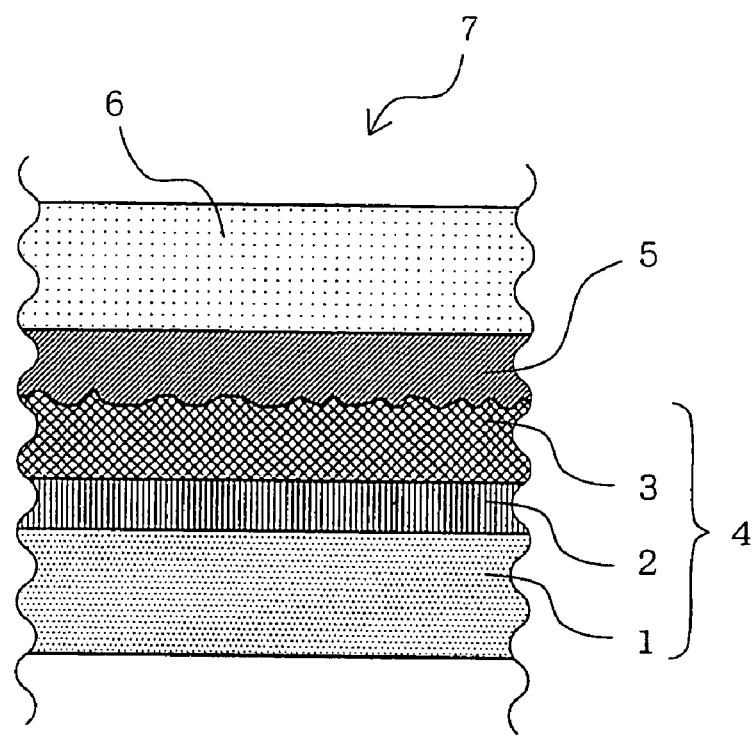
FIGS. 4A and 4B are diagrammatic sectional views illustrating part of examples of pressure-sensitive adhesive tapes (or sheets) employing release liners according to the invention.
Figure 4B:
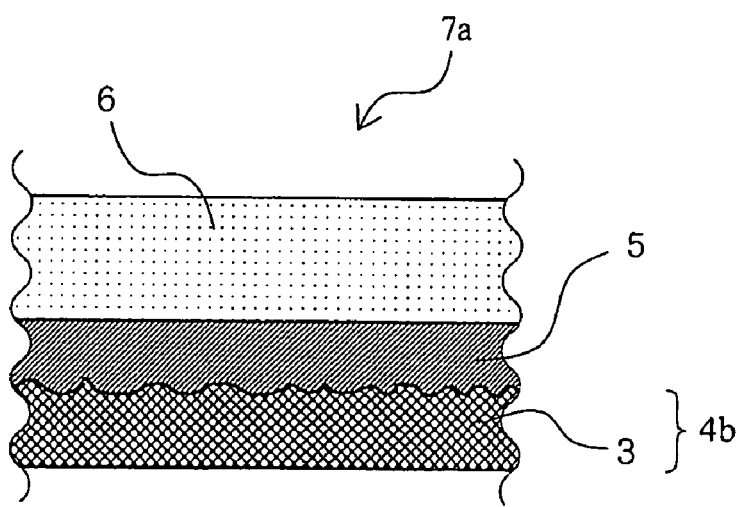
Figure 5A:
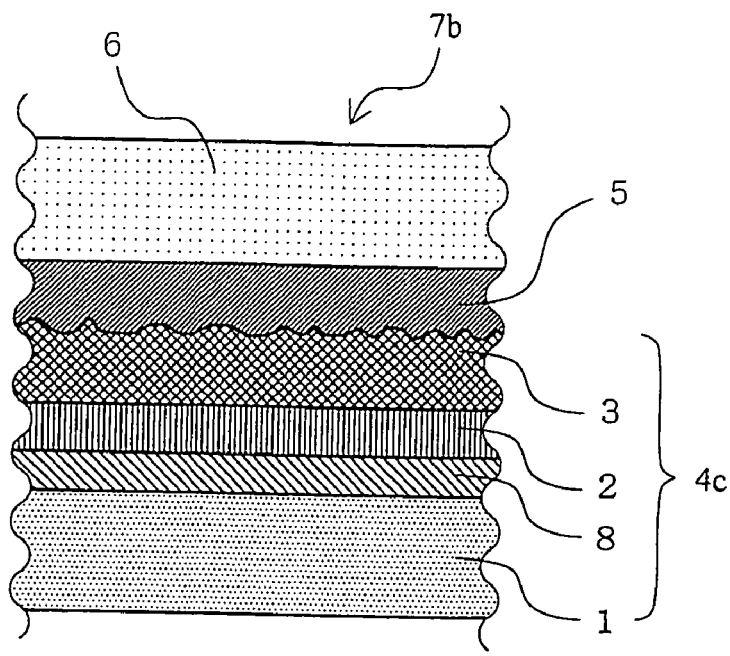
FIGS. 5A and 5B are diagrammatic sectional views illustrating part of other examples of pressure-sensitive adhesive tapes (or sheets) employing release liners according to the invention.
Figure 5B:
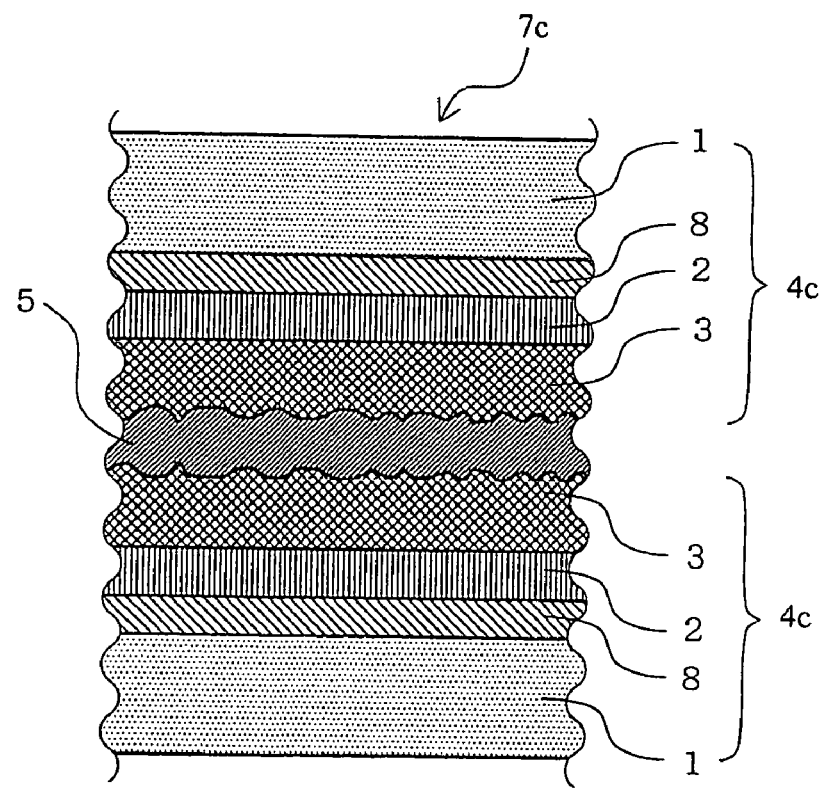

The release liner is not particularly limited as long as it comprises a release layer which is constituted of at least one polyolefin resin and has surface irregularities (surface-irregular release layer). The release layer need not have one or more layers other than the surface-irregular release layer (e.g., a substrate, undercoat layer, and antistatic layer). For example, the release liner may have a constitution comprising an undercoat layer and a surface-irregular release layer which have been formed in this order on a substrate as shown in FIG. 1. Alternatively, the release liner may have a constitution comprising a substrate and a surface-irregular release layer formed on the substrate as shown in FIG. 2A, or may have a constitution consisting of a surface-irregular release layer alone as shown in FIG. 2B. Furthermore, the release liner may have a constitution comprising an antistatic layer, undercoat layer, and surface-irregular release layer which have been formed in this order on a substrate as shown in FIG. 3A, or may have a constitution comprising an undercoat layer and a surface-irregular release layer which have been formed in this order on a substrate having an antistatic layer inside as shown in FIG. 3B. FIGS. 2A and 2B are diagrammatic sectional views illustrating part of other embodiments of the release liner of the invention. In FIGS. 2A and 2B, 4a and 4b each denote a release liner, and 1 and 3 have the same meanings as defined above. Namely, 1 denotes a substrate and 3 denotes a surface-irregular release layer. The release liner 4a shown in FIG. 2A is constituted of a substrate 1 and a surface-irregular release layer 3 directly formed on one side of the substrate 1. The release liner 4b shown in FIG. 2B is constituted of a surface-irregular release layer 3 alone.

FIGS. 3A and 3B are diagrammatic sectional views illustrating part of still other embodiments of the release liner of the invention. In FIGS. 3A and 3B, 1a and 1b each denote a substrate (release-liner substrate), 8 denotes an antistatic layer, and 4c and 4d each denote a release liner. Numerals 1, 2, and 3 have the same meanings as defined above; 1 denotes a substrate, 2 an undercoat layer, and 3 a surface-irregular release layer. The release liner 4c shown in FIG. 3A is constituted of a substrate 1, an antistatic layer 8 formed on one side of the substrate 1, an undercoat layer 2 formed on the antistatic layer 8, and a surface-irregular release layer 3 formed on the undercoat layer 2. The release liner 4d shown in FIG. 3B is constituted of a substrate 1a, an antistatic layer 8 formed on one side of the substrate 1a, a substrate 1b formed on the antistatic layer 8, an undercoat layer 2 formed on one side of the substrate 1b, and a surface-irregular release layer 3 formed on the undercoat layer 2.

(Surface-Irregular Release Layer)

As stated above, the surface-irregular release layer is constituted of at least one polyolefin resin serving as a release agent and has surface irregularities. Examples of the polyolefin resin constituting the surface-irregular release layer include polyethylenes (e.g., low-density polyethylene, linear low-density polyethylene, polyethylene produced by the metallocene catalyst process, medium-density polyethylene, and high-density polyethylene), polypropylene, polybutenes [e.g., poly(1-butene)], poly(4-methyl-1-pentene), and α-olefin copolymers [e.g., copolymers of ethylene with one or more α-olefins having 3-10 carbon atoms (often referred to as "ethylene/α-olefin copolymers") and copolymers of propylene with one or more α-olefins having 4-10 carbon atoms (often referred to as "propylene/α-olefin copolymers")]. Other usable olefin resins include copolymers of ethylene with one or more ingredients other than α-olefins [e.g., ethylene/unsaturated carboxylic acid copolymers such as ethylene/acrylic acid copolymers (EAA) and ethylene/methacrylic acid copolymers (EMAA); ionomers; ethylene/(meth)acrylic ester copolymers such as ethylene/methyl acrylate copolymers, ethylene/ethyl acrylate copolymers (EEA), and ethylene/methyl methacrylate copolymers (EMMA); ethylene/vinyl acetate copolymers (EVA); and ethylene/vinyl alcohol copolymers]. Such polyolefin resins can be used alone or in combination of two or more thereof.

In the ethylene/α-olefin copolymers (copolymers of ethylene with at least one α-olefin having 3-10 carbon atoms), the α-olefin having 3-10 carbon atoms preferably is at least one α-olefin (comonomer) selected from the group consisting of propylene, 1-butene, 1-hexene, 4-methyl-1-pentene, and 1-octene. Consequently, examples of the ethylene/α-olefin copolymers include ethylene/propylene copolymers and ethylene/1-butene copolymers. In the propylene/α-olefin copolymers, the α-olefin having 4-10 carbon atoms preferably is at least one α-olefin (comonomer) selected from the group consisting of 1-butene, 1-hexene, 4-methyl-1-pentene, and 1-octene. Consequently, examples of the propylene/α-olefin copolymers include propylene/1-butene copolymers.

Preferred examples of the polyolefin resin are polyethylenes (in particular, linear low-density polyethylene and low-density polyethylene), polypropylene, polybutenes, poly(4-methyl-1-pentene), and ethylene/α-olefin copolymers. It is especially preferred to use at least two ethylene polymers selected from linear low-density polyethylene, low-density polyethylene, and ethylene/α-olefin copolymers.

The ethylene polymers preferably at least include linear low-density polyethylene. Especially preferably, the ethylene polymers include linear low-density polyethylene as the main component and further include low-density polyethylene and an ethylene/α-olefin copolymer. In the case where the ethylene copolymers include linear low-density polyethylene as the main component and further include low-density polyethylene and an ethylene/α-olefin copolymer, the proportions of these polymers are not particularly limited. However, it is preferred that the amounts of the low-density polyethylene and the ethylene/α-olefin copolymer are, for example, 0-25 parts by weight and 30-300 parts by weight, respectively, per 100 parts by weight of the linear low-density polyethylene. When the proportions of the constituent polymers are outside these ranges, there are cases where troubles arise, such as an impaired releasing function and insufficient moldability.

In producing the linear low-density polyethylene, the comonomer ingredient(s) to be used together with ethylene can be suitably selected. Especially preferred are 1-hexene and 1-octene.

Polyolefin resins including the ethylene polymers can be easily obtained by known methods using suitably selected conditions including polymerization reaction conditions and conditions for subsequent purification/fractionation. Commercial products may be used as they are.

The surface-irregular release layer has recesses and protrusions (in particular, fine recesses and protrusions) on the surface. The recesses and protrusions formed on the surface-irregular release layer may be ones which all have the same shape or which partly have the same shape. Alternatively, the recesses and protrusions all may differ in shape from each other. In the case where the recesses and protrusions are partly equal to or wholly different from each other in shape (i.e., in the case where not all of the recesses and protrusions are equal in shape), the recesses and protrusions may have regularly different shapes or may have irregularly different shapes. Furthermore, the recesses and protrusions may have been disposed in regular arrangement (or at regular intervals) or may have been disposed in irregular arrangement (or at irregular intervals). Consequently, the recesses and protrusions, which are wholly equal in shape or are regularly or irregularly different in shape, may have been disposed in regular or irregular arrangement (or at regular or irregular intervals).

In the invention, the recesses and protrusions preferably are recesses and protrusions which are irregularly different in shape and have been disposed in irregular arrangement (often referred to as "irregular recesses/protrusions"). In this case, the recesses and protrusions especially preferably are fine recesses and protrusions. Namely, it is preferred that the surface irregularities of the release layer should be recesses and protrusions (in particular, fine recesses and protrusions) comprising irregular recesses/protrusions.

As described above, the release layer has surface irregularities. The surface roughness (average roughness) Ra of the release layer is not particularly limited. However, it can be selected in the range of, for example, 0.5-5 µm (preferably 1-3 µm). The surface roughness thereof is especially preferably 1.5-2 µm. When the surface roughness Ra of the release layer is lower than 0.5 µm, there are cases where sufficient releasability cannot be exhibited. On the other hand, when the Ra thereof is higher than 5 µm, there are cases where irregularity transfer to a pressure-sensitive adhesive layer influences airtightness (sealing properties).

The maximum surface roughness Rt of the release layer is not particularly limited. However, it can be selected in the range of, for example, 1-15 µm (preferably 3-10 µm). The maximum surface roughness thereof is especially preferably 4-8 µm. When the maximum surface roughness Rt of the release layer is lower than 1 µm, there are cases where sufficient releasability cannot be exhibited. On the other hand, when the Rt thereof is higher than 15 µm, there are cases where irregularity transfer to a pressure-sensitive adhesive layer influences airtightness (sealing properties).

The surface roughness Ra and maximum surface roughness Rt of a release layer can be measured with contact type surface roughness meter "P-11", manufactured by TENCOR Corp.

For forming recesses and protrusions in producing the surface-irregular release layer, a known or common method of forming recesses and protrusions can be used. Examples thereof include a method in which a polyolefin resin in a molten state is pressed against, e.g., a molding roll having surface irregularities formed by engraving to thereby transfer the irregularities to the resin; and a method in which a layer of a polyolefin resin is formed and a roll or the like which has surface irregularities is then pressed against the layer to form recesses and protrusions on the layer. A suitable one can be selected from known or common methods according to the desired shapes of recesses and protrusions, layer constitution of the release liner, etc.

The surface-irregular release layer may have either a single-layer or a multilayer constitution. The thickness of the surface-irregular release layer is not particularly limited. The thickness thereof may be, for example, 5-20 µm, and is preferably 7-15 µm. When the thickness of the surface-irregular release layer is too small, there are cases where the thickness is not even. On the other hand, when the thickness thereof is too large, there are cases where disposition of the release layer only on one side of a substrate film results in reduced non-curling properties and disposition thereof on both sides results in an increased outgassing amount.

The term "thickness of the surface-irregular release layer" means the distance between the vertex (top) of a protrusion and the lower side of the surface-irregular release layer. The protrusion to be used for determining the thickness of the surface-irregular release layer may be either a protrusion having the maximum height or a protrusion having an average height. It is, however, preferred to employ a protrusion having the maximum height.

(Substrate)

Use of a substrate is optional. Although the substrate is not particularly limited, it is preferred that the substrate to be used should be one which can serve as a reinforcing layer for the whole release liner, does not cause undesirable fouling (e.g., dusting) in a process for release liner production, and has suitability for fine processing.

Examples of the substrate include films or sheets constituted of thermoplastic resins [e.g., films or sheets constituted of known thermoplastic resins such as polyolefin resins, e.g., polyethylene resins such as high-density polyethylene, low-density polyethylene, and linear low-density polyethylene, polypropylene, and poly(4-methylpentene-1); various polyamide resins (e.g., so-called "nylons"); polyesters, e.g., poly(ethylene terephthalate); styrene resins, e.g., polystyrene; and poly(vinyl chloride)] and metal foils (e.g., aluminum foils, stainless-steel foils, and copper foils). One of such thermoplastic resins and metals or a combination of two or more thereof may be used as a material for the substrate. Preferred of these substrates is a film or sheet constituted of polypropylene or a polyester.

The substrate may have either a single-layer or a multilayer constitution. For example, the substrate may be a film coated with a vapor-deposited metal.

The thickness of the substrate is not particularly limited. However, it can be selected in the range of, for example, 10-100 µm (preferably 25-80 µm, more preferably 30-60 µm).

In the invention, the surfaces of the substrate may have undergone a surface treatment such as, e.g., corona discharge treatment.

(Undercoat Layer)

Use of an undercoat layer is optional. An undercoat layer can be formed on at least one side of a substrate as an interlayer between the substrate and the surface-irregular release layer. Such an undercoat layer can be formed from the same polyolefin resin as that constituting the surface-irregular release layer (in particular, a polyethylene resin such as low-density polyethylene).

The undercoat layer may have either a single-layer or a multilayer constitution. The thickness of the undercoat layer can be selected in the range of, for example, 5-20 µm (preferably 8-15 µm). When the thickness of the undercoat layer is too small, there are cases where the thickness is not even. On the other hand, when the thickness thereof is too large, there are cases where disposition of the undercoat layer only on one side of the substrate results in reduced non-curling properties and disposition thereof on both sides results in poor processability.

As described above, the structure of the release liner of the invention is not particularly limited as long as it comprises a surface-irregular release layer; the release liner may have a constitution comprising a substrate and a surface-irregular release layer superposed thereon or may have a constitution constituted of a surface-irregular release layer alone. Examples of the constitution comprising a substrate and a surface-irregular release layer superposed thereon include a constitution in which a surface-irregular release layer has been superposed on one side of a substrate and a constitution in which a surface-irregular release layer has been superposed on each side of a substrate, as shown in FIG. 1 and FIG. 2A. Namely, the release liner may have a constitution in which a surface-irregular release layer has been superposed on at least one side (one side or both sides) of a substrate either directly or through one or more other layers. Examples of such release liner layer constitutions having a substrate include the constitution shown in FIG. 1 in which an undercoat layer and a surface-irregular release layer have been formed in this order on one side of a substrate and the constitution shown in FIG. 2A in which a surface-irregular release layer has been formed on one side of a substrate. Examples thereof further include: a constitution in which an undercoat layer and a surface-irregular release layer have been formed in this order on each side of a substrate; a constitution in which an undercoat layer and a surface-irregular release layer have been formed in this order on one side of a substrate and a surface-irregular release layer has been formed on the other side of the substrate; and a constitution in which a surface-irregular release layer has been formed on each side of a substrate.

A process to be used for producing the release liner can be suitably selected from methods for forming known release liners and from other methods according to the layer constitution of the release liner, etc. For forming the surface recesses and protrusions of the surface-irregular release layer, use can be made of: a method in which when a release layer is formed on a given side of a substrate or undercoat layer, the release layer in an uncured state is molded with, e.g., a molding roll having surface irregularities formed by engraving and is then cured; or a method in which a release layer having a flat surface is formed on a given side of a substrate, undercoat layer, or another layer and then treated with a roll or the like which has surface irregularities to thereby impart recesses and protrusions to the flat surface of the release layer.

In producing the release liner, extrusion and various laminating techniques such as, e.g., coextrusion and extrusion laminating can be used. It is especially preferred to use extrusion laminating. In the case where the release liner has an undercoat layer, it is preferred to use extrusion laminating conducted by the tandem method (tandem extrusion laminating).

In the case where the surface-irregular release layer is formed by tandem extrusion laminating, a method which can be advantageously used is to employ a matte roll as a cooling roll just after extrusion to thereby impart surface irregularities to the uncured release layer just after tandem extrusion laminating. The matte roll can be suitably selected according to the desired surface irregularities of the surface-irregular release layer, etc.

The layers constituting the release liner of the invention each may contain a small amount of other ingredients (e.g., a resin ingredient and additives) according to need.

In the invention, other layers such as, e.g., a primer layer and an antistatic layer (e.g., a metal foil layer or vapor-deposited metal layer) may have been optionally formed, for example, between the substrate and the surface-irregular release layer. The primer layer preferably is one formed from a primer which enables sufficient adhesion between the substrate and the surface-irregular release layer or undercoat layer. The primer more preferably is one which arouses no trouble when the release liner is used as the release liner of a pressure-sensitive adhesive tape (or sheet) for HDDs. For example, it is preferred to use a primer (anchor coating agent) obtained by dissolving, e.g., an ester-urethane adhesive or ether-urethane adhesive in a solvent (e.g., an organic solvent such as an acetic ester, e.g., ethyl acetate, or a ketone, e.g., methyl ethyl ketone or acetone). Incidentally, it is preferred to avoid the use of a primer containing an ethyleneimine compound, silane coupling agent, or the like because such compounds are causative of the corrosion or fouling of inner parts of HDDs. The thickness of the primer layer is preferably 0.5-1.5 µm.

The antistatic layer can be disposed on at least one side of the substrate or in the substrate as shown in FIG. 3A and FIG. 3B. Namely, the antistatic layer can be disposed on a surface of the substrate or in an inner part thereof. In the release line 4c shown in FIG. 3A, an antistatic layer 8 has been formed between a substrate 1 and an undercoat layer 2. In the release liner 4d shown in FIG. 3B, an antistatic layer 8 has been formed between a substrate 1a and a substrate 1b. Namely, in FIGS. 3A and 3B, an antistatic layer has been formed on one of the surfaces of the substrate (specifically, on the surface facing the surface-irregular release layer) or in the substrate.

It is preferred that the release liner of the invention should have an antistatic function as described above. Although the release liner having an antistatic function may be a release liner of the constitution in which an antistatic agent is contained in the substrate, it preferably is a release liner of the constitution which has an antistatic layer on at least one surface of the substrate or within the substrate as shown in FIGS. 3A and 3B. In the case where an antistatic layer has been disposed on at least one side of the substrate, this means that the substrate can have an antistatic layer formed on one side or each side of thereof. In the case where an antistatic layer has been formed on one side of the substrate, this antistatic layer may be present either on that side of the substrate which faces the release layer or that side of the substrate which is opposite to the release layer.

The antistatic layer may have either a single-layer or a multilayer constitution. In the case where an antistatic layer has been formed over a surface of a substrate, the antistatic layer may have been disposed over the substrate through one or more other layers.

The antistatic layer (layer formed by antistatic treatment) may be one formed by applying an antistatic agent comprising a binder and dispersed therein an antistatic ingredient (e.g., an antistatic filler, cationic antistat, anionic antistat, nonionic antistat, or amphoteric antistat). It is, however, preferred that the antistatic layer be a metal foil layer or a vapor-deposited metal layer (vapor-deposited metal film layer). Use of a metal foil layer or vapor-deposited metal layer as the antistatic layer has a merit that the antistatic layer can be designed so as to have an exceedingly small amount of impurities including impurity ions by controlling the contamination of the raw material for the antistatic layer. The metallic material constituting the metal foil layer or vapor-deposited metal layer is not particularly limited. Examples thereof include various metallic elements and alloys comprising various metallic elements, such as aluminum (Al), silver (Ag), gold (Au), nickel (Ni), stainless steel, copper, iron, chromium, titanium, cobalt, molybdenum, platinum, tungsten, tantalum, niobium, palladium, solder alloys, nickel-chromium alloys, nickel-chromium-iron alloys, copper-manganese-nickel alloys, nickel-manganese-iron alloys, and copper-nickel alloys. The metallic material preferably is aluminum from the standpoints of processability, etc. Those metallic materials can be used in the form of a foil or in the form of a powder (e.g., a fine powder or fine particles) or fibers. Those metallic materials may have been used alone or in combination of two or more thereof.

A metal foil can be superposed, for example, on a surface of a substrate by a known or common laminating technique. For example, a foil of the metallic material (metal foil) is superposed on that side of a substrate on which a metal foil is to be superposed (e.g., one side of the substrate) by a known or common laminating technique, whereby an antistatic layer comprising the metal foil can be formed.

The vapor deposition of a metal can be conducted by a known or common technique such as, e.g., vacuum deposition. For example, the metallic material in the form of a fine powder, fibers, or the like is used to form a vapor-deposited metal film on that side of a substrate on which a vapor-deposited metal film is to be formed (e.g., one side of the substrate) by a known or common vapor deposition technique such as vacuum deposition, whereby an antistatic layer comprising a vapor-deposited metal layer can be produced.

In the case where the antistatic layer is one formed by applying an antistatic agent, the antistatic ingredient contained in the antistatic agent is as follows. Examples of the antistatic filler include metal powders or fibers made of various metallic elements or alloys comprising various metallic elements (e.g., copper alloys), such as aluminum, silver, gold, nickel, stainless steel, copper, iron, chromium, titanium, cobalt, molybdenum, platinum, tungsten, tantalum, niobium, palladium, solder alloys, nickel-chromium alloys, nickel-chromium-iron alloys, copper-manganese-nickel alloys, nickel-manganese-iron alloys, and copper-nickel alloys; metal oxide powders or fibers made of zinc oxide, indium oxide, titanium oxide, or titanium black; carbon powders or fibers made of carbonaceous materials such as acetylene black, Ketjen black, natural graphite, artificial graphite, and other carbon blacks; conductive polymer particles made of conductive polymers such as polypyrrole, polyaniline, polyacetylene, polythiophene, polyphenylenevinylene, and polyacenes; and particles coated with various materials such as these powders, fibers, or particles (e.g., elemental metals, alloys, metal oxides, carbonaceous materials, and conductive polymers) (e.g., fine copper or silver particles coated with a noble metal). When the antistatic ingredient contained in the antistatic agent comprises a cationic antistat, anionic antistat, nonionic antistat, amphoteric antistat, or the like, these antistats are not particularly limited and can be suitably selected respectively from known cationic antistats, known anionic antistats, known nonionic antistats, known amphoteric antistats, or the like. These antistatic ingredients including antistatic fillers can be used alone or in combination of two or more thereof.

The binder to be used for dispersing the antistatic ingredient, e.g., an antistatic filler, therein is not particularly limited. For example, use can be made of a thermoplastic resin such as a polyester, polyamide, acrylic resin, or polyurethane or a radiation-curable resin (e.g., an ultraviolet-curable resin) such as an ultraviolet-curable acrylic resin. Such binders can be used alone or in combination of two or more thereof.

Such an antistatic agent (antistatic agent comprising a binder and dispersed therein an antistatic ingredient, e.g., an antistatic filler) is applied to, e.g., that side of a substrate on which an antistatic layer comprising an antistatic agent is to be formed (e.g., one side of the substrate) by a known or common coating technique and dried, whereby an antistatic layer can be formed. It is also possible to use a method in which a sheet comprising a binder and dispersed therein an antistatic ingredient, e.g., an antistatic filler, is formed beforehand and this sheet is laminated to that side of a substrate on which an antistatic layer is to be formed (e.g., one side of the substrate) to thereby form an antistatic layer comprising an antistatic agent. In forming such an antistatic layer, various adhesion-enhancing techniques such as one using an adhesive may be used according to need.

The thickness of the antistatic layer is not particularly limited and can be selected, for example, in the range of 0.01-10 µm (preferably 0.04-5 µm). Incidentally, the thickness of the vapor-deposited metal layer is generally 0.01-2 µm (preferably 0.04-1 µm). When the thickness of the antistatic layer is smaller than 0.01 µm, there are cases where a sufficient antistatic effect cannot be obtained. On the other hand, in case where the thickness thereof is larger than 10 µm, this results in excessive quality and is economically disadvantageous.

In the case where the release liner of the invention is one in which a surface-irregular release layer has been formed on a substrate or on an undercoat layer or antistatic layer, the proportions of the thicknesses of these layers in this multilayer structure are as follows. The ratio of the thickness of the substrate or the thickness of the substrate and antistatic layer (when the antistatic layer is present) to the thickness of the surface-irregular release layer formed on either side of the substrate or the thickness of the surface-irregular release layer and undercoat layer (when the undercoat layer is present), i.e., [(thickness of substrate+antistatic layer):(thickness of surface-irregular release layer+undercoat layer)], is preferably from 9:1 to 6:4, more preferably from 8:2 to 7:3. In case where the thickness of the surface-irregular release layer or of the surface-irregular release layer and undercoat layer is too large as compared with the thickness of the substrate or of the substrate and antistatic layer, the release liner obtained through laminating suffers curling due to the contraction of the polyethylene material. When this release liner is used as the release liner of a pressure-sensitive adhesive tape (or sheet) for HDDs, difficulties in operation are encountered when the adhesive tape or sheet is subjected to a processing, e.g., fine punching. In addition, since the polyethylene material shows enhanced elongation during punching, the adhesive tape or sheet has reduced suitability for cutting to give punched pieces having a shape such as one formed by tearing.

The overall thickness of the release liner is not particularly limited. However, it is preferably 40-150 μm, more preferably 50-120 μm. In the case where the release liner comprises a substrate and a surface-irregular release layer formed only on one side of the substrate, the overall thickness of this release liner is preferably 40-100 μm, more preferably 50-100 μm. As long as the overall thickness of the release liner is within this range, suitability for stripping operation and suitability for cutting, etc. can be sufficiently secured when the release liner is used as the release liner of a pressure-sensitive adhesive tape (or sheet) for HDDs.

The release liner described above can be used for protecting the pressure-sensitive adhesive layer of a pressure-sensitive adhesive tape or sheet as shown in FIGS. 4A and 4B and FIGS. 5A and 5B. FIGS. 4A, 4B, 5A and 5B are diagrammatic sectional views illustrating part of examples of pressure-sensitive adhesive tapes (or sheets) employing release liners according to the invention. In FIGS. 4A and 4B and FIGS. 5A and 5B, numeral 5 denotes a pressure-sensitive adhesive layer, 6 a supporting base (supporting base for pressure-sensitive adhesive tapes), and 7, 7a, 7b, and 7c a pressure-sensitive adhesive tape. Furthermore, 1 to 4, 4b, and 4c have the same meanings as defined above; 1 denotes a substrate, 2 an undercoat layer, 3 a surface-irregular release layer, and 4, 4b, and 4c a release liner. The pressure-sensitive adhesive tape 7 shown in FIG. 4A comprises a supporting base 6, a pressure-sensitive adhesive layer 5 formed on the base 6, and a release liner 4 superposed on the pressure-sensitive adhesive layer 5 so that the surface-irregular release layer 3 is in contact with the pressure-sensitive adhesive layer 5. The pressure-sensitive adhesive tape 7a shown in FIG. 4B comprises a supporting base 6, a pressure-sensitive adhesive layer 5 formed on the base 6, and a release liner 4b superposed on the pressure-sensitive adhesive layer 5 so that the surface-irregular release layer 3 is in contact with the pressure-sensitive adhesive layer 5. The pressure-sensitive adhesive tape 7b shown in FIG. 5A comprises a supporting base 6, a pressure-sensitive adhesive layer 5 formed on the base 6, and a release liner 4c superposed on the pressure-sensitive adhesive layer 5 so that the surface-irregular release layer 3 is in contact with the pressure-sensitive adhesive layer 5. Furthermore, the pressure-sensitive adhesive tape 7d shown in FIG. 5B comprises a pressure-sensitive adhesive layer 5 and a release liner 4c superposed on each side of the adhesive layer 5 so that each surface-irregular release layer 3 is in contact with the pressure-sensitive adhesive layer 5.

[Pressure-Sensitive Adhesive Tape or Sheet]

As shown in FIGS. 4A, 4B, 5A and 5B, the pressure-sensitive adhesive tape or sheet of the invention has a constitution in which a release liner (4, 4b, or 4c) has been superposed on a pressure-sensitive adhesive layer 5 so that the surface-irregular release layer 3 of the release liner (4, 4b, or 4c) is in contact with the pressure-sensitive adhesive layer 5. Incidentally, the pressure-sensitive adhesive tapes or sheets (7, 7a, and 7b) shown in FIGS. 4A and 4B and FIG. 5A have a constitution in which a pressure-sensitive adhesive layer 5 has been superposed on a supporting base 6, and are pressure-sensitive adhesive tapes or sheets of the base-supported type. On the other hand, the pressure-sensitive adhesive tape or sheet 7c shown in FIG. 5B has a constitution which includes a pressure-sensitive adhesive layer 5 not supported by a base. Namely, this is a pressure-sensitive adhesive tape or sheet of the base-less type.

(Supporting Base)

Examples of the supporting base in the pressure-sensitive adhesive tape or sheet include plastic films and sheets made of thermoplastic resins such as polyolefin resins, e.g., high-density polyethylene, low-density polyethylene, linear low-density polyethylene, polypropylene, and poly(4-methylpentene-1), polyesters, e.g., poly(ethylene terephthalate), styrene resins, e.g., polystyrene, and poly(vinyl chloride); foams of such films or sheets; metal foils such as aluminum foils, stainless-steel foils, and copper foils; and laminates of these. Examples of the laminates include laminates of a polyester film made of, e.g., poly(ethylene terephthalate) with a metal foil such as, e.g., an aluminum foil or copper foil (e.g., a polyester film/metal foil laminate and a polyester film/metal foil/polyester film laminate). The thickness of the supporting base can be suitably selected in a range in which handleability and other properties are not impaired. However, it is generally 5-300 μm, preferably 10-200 μm.

(Pressure-Sensitive Adhesive Layer)

The pressure-sensitive adhesive to be used for constituting the pressure-sensitive adhesive layer in the pressure-sensitive adhesive tape or sheet can be selected from various pressure-sensitive adhesives. However, one preferred pressure-sensitive adhesive is a poly((meth)acrylic ester)-based adhesive (acrylic adhesive). This adhesive is prepared by using as the main component an acrylic polymer obtained by a polymerization method such as, e.g., solution polymerization or emulsion polymerization and adding various additives such as, e.g., a crosslinking agent, tackifier, softener, antioxidant, and filler to the polymer according to need. The acrylic polymer can be produced, for example, by the copolymerization of a monomer mixture comprising one or more alkyl (meth)acrylates such as ethyl (meth)acrylate, butyl (meth)acrylate, and 2-ethylhexyl (meth)acrylate [preferably (meth)acrylates having up to 5 carbon atoms] as the main component and optionally further containing other monomers such as, e.g., 2-hydroxyethyl (meth)acrylate, (meth)acrylic acid, styrene, and vinyl acetate as copolymerizable modifying monomers. When an acrylic adhesive comprising any of such acrylic polymers as the main component is used, highly satisfactory results are obtained with respect to releasability.

The type of the pressure-sensitive adhesive is not particularly limited. However, the pressure-sensitive adhesive is generally of the solvent-based type, emulsion type, hot-melt type (solventless type), or the like from the standpoints of handleability, etc. Besides being used alone, those acrylic pressure-sensitive adhesives may be used in the form of a blend prepared by mixing two or more thereof by a known technique, as long as the performances required of the adhesive are not impaired.

The pressure-sensitive adhesive layer can be formed, for example, by applying the adhesive of the solvent-based, emulsion, or hot-melt type or another type on a supporting base and drying the adhesive. It should be noted that when a pressure-sensitive adhesive layer is formed by a method in which the pressure-sensitive adhesive for constituting the pressure-sensitive adhesive layer is directly applied to a surface-irregular release layer, there are cases where satisfactory releasability is not obtained. It is therefore preferred to use a method in which a pressure-sensitive adhesive layer is formed on a supporting base and a release liner is then laminated thereto so that the surface-irregular release layer comes into contact with the pressure-sensitive adhesive layer to thereby produce a pressure-sensitive adhesive tape or sheet.

The thickness of the pressure-sensitive adhesive layer may be 10-200 μm (preferably 20-150 μm).

The constitution of the pressure-sensitive adhesive tape or sheet of the invention is not limited to those described above, and the pressure-sensitive adhesive tape or sheet can have other constitutions. The pressure-sensitive adhesive tape or sheet may be a pressure-sensitive adhesive tape or sheet in which one side only is a pressure-sensitive adhesive side (single-sided pressure-sensitive adhesive tape or sheet) or may be a pressure-sensitive adhesive tape or sheet in which both sides each are a pressure-sensitive adhesive side (double-sided pressure-sensitive adhesive tape or sheet). Furthermore, the double-sided pressure-sensitive adhesive tape or sheet may be either a double-sided pressure-sensitive adhesive tape or sheet having a supporting base (base-supported double-sided pressure-sensitive adhesive tape or sheet) or a double-sided pressure-sensitive adhesive tape or sheet having no supporting base (base-less double-sided pressure-sensitive adhesive tape or sheet).

Such a pressure-sensitive adhesive tape or sheet employs at least one release liner having a surface-irregular release layer. For example, in the case where the pressure-sensitive adhesive tape or sheet is a single-sided pressure-sensitive adhesive tape or sheet, one release liner is used. On the other hand, in the case where the pressure-sensitive adhesive tape or sheet is a double-sided pressure-sensitive adhesive tape or sheet, two release liners may be used or one release liner in which each side is the surface of a surface-irregular release layer may be used.

The pressure-sensitive adhesive tape or sheet of the invention is useful as a silicone-free pressure-sensitive adhesive tape or sheet for use in the field of electronic materials, in particular, for hard-disk drives for computers.

The invention will be explained below in more detail by reference to Examples thereof, but the invention should not be construed as being limited by these Examples in any way. Hereinafter, all parts are by weight.

EXAMPLE 1

Low-density polyethylene (trade name "L-1850A" manufactured by Asahi Kasei Santec) was laminated to a poly(ethylene terephthalate) film (trade name "Lumirror S-105-50" manufactured by Toray Industries, Inc.; thickness, 50 μm; substrate) by tandem extrusion laminating at a die lip temperature of 325° C. in a thickness of 10 μm on a dry basis to form an undercoat layer. Subsequently, a resin composition (ingredients for constituting a release layer) prepared by mixing 100 parts of a resin blend (trade name "Moretec 0628D" manufactured by Idemitsu Petrochemical Co., Ltd.; resin blend consisting of linear low-density polyethylene and 15% by weight low-density polyethylene added thereto) with 300 parts of an ethylene/propylene copolymer (trade name "Tafmer P0180" manufactured by Mitsui Chemicals, Inc.) was laminated to the undercoat layer by extrusion laminating at a die lip temperature of 273° C. in a thickness of 10 μm on a dry basis to form a release layer. Furthermore, a cooling matte roll having an embossed surface was used as a cooling roll to impart fine recesses and protrusions to the surface of the release layer and thereby form a release layer having surface irregularities (surface-irregular release layer). Thus, a release liner was produced.

The surface irregularities of the surface-irregular release layer are recesses and protrusions which are irregularly different in shape and have been disposed in irregular arrangement. This surface-irregular release layer had a surface roughness Ra of 1.5 μm and a maximum roughness of 4 μm.

In the release liner, the ratio of the thickness of the poly(ethylene terephthalate) film as a substrate to the thickness of the resin layers laminated thereto (undercoat layer and release layer) was 5:2 [(thickness of the poly(ethylene terephthalate) film):(thickness of the resin layers laminated)]. The overall thickness of the release liner was 70 μm.

On the other hand, 93 parts of n-butyl acrylate and 7 parts of acrylic acid were subjected to solution polymerization by an ordinary method using ethyl acetate as a solvent and azobisisobutyronitrile as an initiator to obtain a solution of an acrylic polymer having a weight-average molecular weight of 1,500,000 (solid concentration, 25% by weight). A crosslinking agent (trade name "Coronate L" manufactured by Nippon Polyurethane Co., Ltd.; tolylene diisocyanate adduct of trimethylolpropane) was incorporated into the solution in an amount of 2 parts per 100 parts of the acrylic polymer to prepare a solution of a pressure-sensitive adhesive composition (acrylic pressure-sensitive adhesive).

This pressure-sensitive adhesive composition solution was applied to a poly(ethylene terephthalate) film (thickness, 50 μm) and dried at 140° C. for 3 minutes to form a pressure-sensitive adhesive composition layer (pressure-sensitive adhesive layer) having a thickness of 25 μm. The release liner produced above was laminated to the pressure-sensitive adhesive side (surface of the pressure-sensitive adhesive layer) so that the release layer came into contact with the adhesive side. Thus, a pressure-sensitive adhesive tape was produced.

EXAMPLE 2

A release liner was produced in the same manner as in Example 1, except that a resin composition prepared by mixing 100 parts of a resin blend (trade name "Moretec 0628D" manufactured by Idemitsu Petrochemical Co., Ltd.; resin blend consisting of linear low-density polyethylene and 15% by weight low-density polyethylene added thereto) with 100 parts of an ethylene/propylene copolymer (trade name "Tafmer P0180" manufactured by Mitsui Chemicals, Inc.) was used as ingredients for constituting a release layer, and that a surface-irregular release layer was formed which had a surface roughness Ra of 2 μm and a maximum roughness of 8 μm and in which the surface irregularities were recesses and protrusions irregularly different in shape and disposed in irregular arrangement.

A pressure-sensitive adhesive tape was produced in the same manner as in Example 1, except that this release liner was used.

COMPARATIVE EXAMPLE 1

A release liner was produced in the same manner as in Example 1, except that a resin composition prepared by mixing 100 parts of a resin blend (trade name "Moretec 0628D" manufactured by Idemitsu Petrochemical Co., Ltd.; resin blend consisting of linear low-density polyethylene and 15% by weight low-density polyethylene added thereto) with 10 parts of an ethylene/propylene copolymer (trade name "Tafmer P0180" manufactured by Mitsui Chemicals, Inc.) was used as ingredients for constituting a release layer, and that a mirror roll was used as a cooling roll so as not to impart fine recesses and protrusions to the surface of the release layer.

A pressure-sensitive adhesive tape was produced in the same manner as in Example 1, except that this release liner was used.

(Evaluation)

The release liners and pressure-sensitive adhesive tapes obtained in Examples 1 and 2 and Comparative Example 1 were examined for the resistance force required for each release liner to be peeled from the pressure-sensitive adhesive tape (so-called "peel force") by the method of releasability test shown below. The release liners were thus evaluated for releasability. The results of this evaluation are shown in Table 1.

[Releasability Test]

A pressure-sensitive adhesive tape was cut into a width of 50 mm to produce a test piece. Using a universal tensile tester, the release liner was peeled from the test piece in the 180° direction at a cross-head speed of 1 m/min in an atmosphere of 23° C. and 60% RH. The resistance force required for this peeling (peel force) (unit, N/50 mm) was measured. The results of this measurement are shown in the row "Peel force" in Table 1.

TABLE 1

|  | Example 1 | Example 2 | Comparative Example 1 |
| --- | --- | --- | --- |
| Peel force (N/50 mm) | 0.2 | 0.2 | 1.0 |

EXAMPLE 3

Low-density polyethylene [density, 0.918 g/cm$^3$; melt flow rate (MFR), 5.0 g/10 min (190° C.); trade name "L-1850A" manufactured by Asahi Kasei Santec] was laminated to the aluminum layer side of a poly(ethylene terephthalate) film having a vapor-deposited aluminum layer on one side (trade name "Metalumy TS" manufactured by Toh-Meta Co., Ltd.; thickness, 50 μm; substrate) by tandem extrusion laminating at a die lip temperature of 325° C. in a thickness of 10 μm on a dry basis to form an undercoat layer. Subsequently, a resin composition (ingredients for constituting a release layer) prepared by mixing 100 parts of a resin blend [density, 0.916 g/cm$^3$; MFR, 6.0 g/10 min (190° C.); trade name "Moretec 0628D" manufactured by Idemitsu Petrochemical Co., Ltd.; resin blend consisting of linear low-density polyethylene and 15% by weight low-density polyethylene added thereto] with 300 parts of an ethylene/propylene copolymer [density, 0.88 g/cm$^3$; MFR, 4.5 g/10 min (190° C.); trade name "Tafmer P0180" manufactured by Mitsui Chemicals, Inc.] was laminated to the undercoat layer by extrusion laminating at a die lip temperature of 273° C. in a thickness of 10 μm on a dry basis to form a release layer. Furthermore, a cooling matte roll having an embossed surface was used as a cooling roll to impart fine recesses and protrusions to the surface of the release layer and thereby form a release layer having surface irregularities (surface-irregular release layer). Thus, a release liner was produced.

The surface irregularities of the surface-irregular release layer are recesses and protrusions which are irregularly different in shape and have been disposed in irregular arrangement. This surface-irregular release layer had a surface roughness Ra of 1.5 μm and a maximum roughness of 4 μm.

In the release liner, the ratio of the thickness of the poly (ethylene terephthalate) film having a vapor-deposited aluminum layer as a substrate to the thickness of the resin layers laminated thereto (undercoat layer and release layer) was 5:2 [(thickness of the poly(ethylene terephthalate) film with vapor-deposited aluminum layer): (thickness of the resin layers laminated)]. The overall thickness of the release liner was 70 μm.

On the other hand, 93 parts of n-butyl acrylate and 7 parts of acrylic acid were subjected to solution polymerization by an ordinary method using ethyl acetate as a solvent and azobisisobutyronitrile as an initiator to obtain a solution of an acrylic polymer having a weight-average molecular weight of 1,500,000 (solid concentration, 25% by weight). A crosslinking agent (trade name "Coronate L" manufactured by Nippon Polyurethane Co., Ltd.; tolylene diisocyanate adduct of trimethylolpropane) was incorporated into the solution in an amount of 2 parts per 100 parts of the acrylic polymer to prepare a solution of a pressure-sensitive adhesive composition (acrylic pressure-sensitive adhesive).

This pressure-sensitive adhesive composition solution was applied to a supporting laminate base having a layer constitution comprising poly(ethylene terephthalate) (thickness, 9 μm)/aluminum foil (thickness, 7 μm)/poly(ethylene terephthalate) film (thickness, 9 μm) (total thickness, 31 μm; the constituent layers had been united by dry laminating with an adhesive), and dried at 140° C. for 3 minutes to form a pressure-sensitive adhesive composition layer (pressure-sensitive adhesive layer) having a thickness of 25 μm. The release liner produced above was laminated to the pressure-sensitive adhesive side (surface of the pressure-sensitive adhesive layer) so that the release layer came into contact with the adhesive side. Thus, a pressure-sensitive adhesive tape was produced.

EXAMPLE 4

A release liner was produced in the same manner as in Example 3, except that a resin composition prepared by mixing 100 parts of a resin blend [density, 0.916 g/cm$^3$; MFR, 6.0 g/10 min (190° C.); trade name "Moretec 0628D" manufactured by Idemitsu Petrochemical Co., Ltd.; resin blend consisting of linear low-density polyethylene and 15% by weight low-density polyethylene added thereto] with 100 parts of an ethylene/propylene copolymer [density, 0.88 g/cm$^3$; MFR, 4.5 g/10 min (190° C.); trade name "Tafmer P0180" manufactured by Mitsui Chemicals, Inc.] was used as ingredients for constituting a release layer, and that a surface-irregular release layer was formed which had a surface roughness Ra of 2 μm and a maximum roughness of 8 μm and in which the surface irregularities were recesses and protrusions irregularly different in shape and disposed in irregular arrangement.

A pressure-sensitive adhesive tape was produced in the same manner as in Example 3, except that this release liner was used.

COMPARATIVE EXAMPLE 2

A release liner was produced in the same manner as in Example 3, except that a resin composition prepared by mixing 100 parts of a resin blend [density, 0.916 g/cm$^3$; MFR, 6.0 g/10 min (190° C.); trade name "Moretec 0628D" manufactured by Idemitsu Petrochemical Co., Ltd.; resin blend consisting of linear low-density polyethylene and 15% by weight low-density polyethylene added thereto] with 10 parts of an ethylene/propylene copolymer [density, 0.88 g/cm$^3$; MFR, 4.5 g/10 min (190° C.); trade name "Tafmer P0180" manufactured by Mitsui Chemicals, Inc.] was used as ingredients for constituting a release layer, and that a mirror roll was used as a cooling roll so as not to impart fine recesses and protrusions to the surface of the release layer.

A pressure-sensitive adhesive tape was produced in the same manner as in Example 3, except that this release liner was used.

(Evaluation)

The release liners and pressure-sensitive adhesive tapes obtained in Examples 3 and 4 and Comparative Example 2 were examined for the resistance force required for each release liner to be peeled from the pressure-sensitive adhesive tape (so-called "peel force") by the method of releasability test shown above. The release liners were thus evaluated for releasability. Furthermore, each release liner was evaluated for antistatic properties by measuring the amount of static buildup occurring when the release liner was peeled from the pressure-sensitive adhesive tape (peel charge amount) by the method of peel charge amount measurement shown below. The results of this evaluation are shown in Table 2.

[Peel Charge Amount Measurement]

A pressure-sensitive adhesive tape was cut into a size of 50 mm (width)×150 mm (length). The release liner was peeled from the pressure-sensitive adhesive tape at a rate of 2 m/min in an atmosphere of 25° C. and 65% RH. The amount of the resultant peel charge, i.e., the static buildup which occurred on the release layer surface when the release liner was thus peeled off, was measured with a surface potential meter (digital oscilloscope, trade name "DS-8812" manufactured by IWATSU Corp.). In this measurement, the height of the probe for surface potential measurement was set at 5 mm from the surface of the release liner (surface of the release layer).

TABLE 2

|  | Example 3 | Example 4 | Comparative Example 2 |
| --- | --- | --- | --- |
| Peel force (N/50 mm) | 0.2 | 0.2 | 0.4 |
| Peel charge amount (V) | 20 | 20 | 400 |

The results given in Table 1 clearly show the following. The pressure-sensitive adhesive tapes of Examples 1 and 2 according to the invention do not cause hard-disk drive fouling, which occurs when a silicone release agent is used, and can be satisfactorily and smoothly stripped off as compared with the adhesive tape of Comparative Example 1, although these pressure-sensitive adhesive tapes according to the invention employ not an expensive silicone release agent but an inexpensive polyolefin resin as a release agent. These pressure-sensitive adhesive tapes can hence be applied by a "high-speed automatic machine application system".

Furthermore, the results given Table 2 clearly show that the pressure-sensitive adhesive tapes of Examples 3 and 4 according to the invention can be satisfactorily and smoothly peeled off and are reduced in the voltage level for the static buildup occurring in the peeling of the release liner (i.e., reduced in peel charge amount) as compared with the pressure-sensitive adhesive tape of Comparative Example 3.

According to the release liner of the invention, the release layer can be smoothly separated from pressure-sensitive adhesive layers without the necessity of using a silicone release agent in the release layer. Furthermore, the voltage level for the static buildup occurring when the release liner is stripped from pressure-sensitive adhesive tapes or sheets can be reduced. Consequently, the pressure-sensitive adhesive tape or sheet employing the release liner, when applied to a hard-disk drive, does not foul the hard-disk drive and can be applied by a "high-speed automatic machine application system" even when the pressure-sensitive adhesive layer has high tackiness. This pressure-sensitive adhesive tape or sheet is hence useful for hard-disk drives.

While the invention has been described in detail and with reference to specific embodiments thereof, it will be apparent to one skilled in the art that various changes and modifications can be made therein without departing from the spirit and scope thereof.

What is claimed is:

1. A release liner comprising a substrate and a release layer superposed over the substrate directly or through one or more other layers, wherein the release layer is constituted of at least two ethylene polymers selected from linear low-density polyethylene, low-density polyethylene, and ethylene/α-olefins copolymers, has surface irregularities constituted of recesses and protrusions which are irregularly different in shape and have been disposed in irregular arrangement, and has a surface roughness Ra of 1-3 μm.

2. The release liner of claim 1, which has an antistatic function.

3. The release liner of claim 2, which has an antistatic layer disposed on at least one side of the substrate or in the substrate.

4. The release liner of claim 3, wherein the antistatic layer is a metal foil layer or a vapor-deposited metal layer.

5. The release liner of claim 1, wherein one of the at least two ethylene polymers is ethylene/α-olefins copolymers.

6. The release liner of claim 1, wherein the release layer is constituted of low-density polyethylene, ethylene/α-olefins copolymers and linear low-density polyethylene, wherein the low-density polyethylene is in amount of 0-25 parts by weight, the ethylene/α-olefins copolymers is in amount of 30-300 parts by weight, and the linear low-density polyethylene is in amount of 100 parts by weight.

7. A pressure-sensitive adhesive tape or sheet having a pressure-sensitive adhesive layer, wherein the release liner of any one of claims 1 or 2 to 4 has been superposed on the pressure-sensitive adhesive layer in such a manner that the pressure-sensitive adhesive layer is in contact with the release layer.

8. The pressure-sensitive adhesive tape or sheet of claim 7, wherein the pressure-sensitive adhesive layer is constituted of an acrylic pressure-sensitive adhesive.

9. The pressure-sensitive adhesive tape or sheet of claim 7, which has a constitution comprising the pressure-sensitive adhesive layer formed by applying a pressure-sensitive adhesive to a supporting base and the release liner laminated to the pressure-sensitive adhesive layer.

10. The pressure-sensitive adhesive tape or sheet of claim 7, which is a pressure-sensitive adhesive tape or sheet for hard-disk drives.

* * * * *